(12) United States Patent
Hose et al.

(10) Patent No.: US 6,898,610 B2
(45) Date of Patent: May 24, 2005

(54) APPARATUS AND METHOD FOR SPACE ALLOCATION OF IMAGE AND AUDIO INFORMATION

(75) Inventors: Jesse Hose, Carlsbad, CA (US);
Michael Mitrani, San Diego, CA (US);
Jason Reich, San Diego, CA (US)

(73) Assignee: Technicolor Digital Cinema LLC, Burbank, CA (US)

( * ) Notice: Subject to any disclaimer, the term of this patent is extended or adjusted under 35 U.S.C. 154(b) by 350 days.

(21) Appl. No.: 09/796,418

(22) Filed: Feb. 28, 2001

(65) Prior Publication Data

US 2002/0120606 A1 Aug. 29, 2002

(51) Int. Cl.[7] ............................................. G06F 17/30
(52) U.S. Cl. ........................................ 707/205; 707/2
(58) Field of Search .................... 707/1–10, 100–104.1, 707/200–205; 714/5; 711/100; 386/46

(56) References Cited

U.S. PATENT DOCUMENTS 5,418,940 A * 5/1995 Mohan ........................... 714/5
5,490,260 A * 2/1996 Miller et al. ................. 711/100
6,587,634 B2 * 7/2003 Maltz et al. ................... 386/46

* cited by examiner

*Primary Examiner*—Mohammad Ali
(74) *Attorney, Agent, or Firm*—Joseph S. Tripoli; Robert B. Levy; Joseph J. Laks

(57) ABSTRACT

The invention provides a method of storing trailer data and feature data on at least one storage medium. The method includes the steps of partitioning each storage medium into first portions and second portions. The compressed trailer data is stored onto at least one of the first portions. The compressed feature data is stored onto at least one of the second portions.

51 Claims, 2 Drawing Sheets

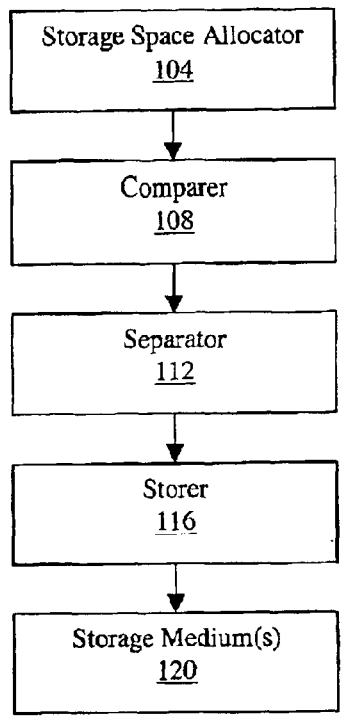
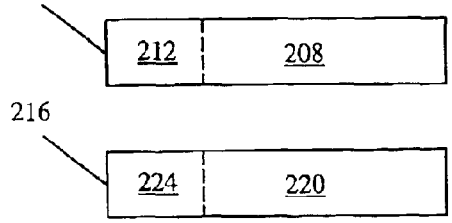
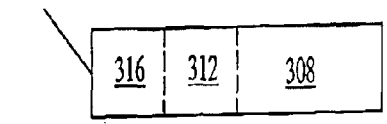
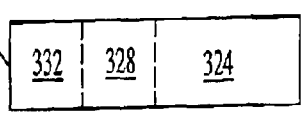
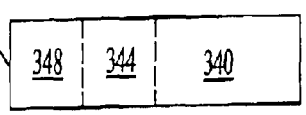

APPARATUS AND METHOD FOR SPACE ALLOCATION OF IMAGE AND AUDIO INFORMATION

BACKGROUND OF THE INVENTION

I. Field of the Invention

The present invention relates to allocation of storage space. More specifically, the invention relates to an apparatus method for storing groups of data on one or more storage media.

II. Description of the Related Art

Digital Cinema systems deliver full-length motion pictures, trailers, advertisements and other audio/visual "cinema-quality" programs to theatres throughout the world using digital technology. Digital Cinema systems deliver motion pictures that have been digitized, compressed and encrypted to theatres using either physical media distribution (such as DVD-ROM's) or electronic transmission methods, such as satellite.

Authorized theatres automatically receive the digitized programs and store them, typically while still encrypted and compressed. At each showing, the digitized information is retrieved using a local area network from the storage medium, then is decrypted, decompressed and displayed using cinema-quality electronic projectors featuring high quality digital sound.

The theatre operator stores the variety of programs received on magnetic storage devices, such as hard disks. Programs are typically stored sequentially and are often erased and reloaded, depending upon the need at given auditoriums at given times. Also, when new programs are received, old programs are erased.

As the cycle of storing and erasing programs continue, hard disks tend to fragment. Smaller files, such as management files and trailers, are subject to greater fragmentation. Fragmented feature files pose performance problems, as such files may need to be accessed in time critical ways. Further, general defragmenting of hard disks take place over the entire disk, and therefore, are more time consuming.

Moreover, some features and trailers require storage space that consumes more than one hard disk. Thus, when creating a playlist of programs to be displayed, it is not clear on which part of a hard disk or which hard disk given programming resides. Consequently, there is a need in the art for an apparatus and method for organized storage of groups of data on storage media.

SUMMARY OF THE INVENTION

The present invention is directed to a novel apparatus and method for organized storage of groups of data on storage media. Specifically, an apparatus for the storage of a first group and a second group of data on at least one storage medium is claimed. A storage space allocator is configured to partition the first storage medium into a first segment and a second segment. A comparer is configured to compare the space needed to store the first group of data with the amount of space available on the first segment and to compare the space needed to store the second group of data with the amount of space available on the second segment. A separator is configured to separate the first group of data into a first primary portion and a first secondary portion if the space needed to store the first group of data is greater than the amount of space available on the first segment, and to separate the second group of data into a second primary portion and a second secondary portion if the space needed to store the second group of data is greater than the amount of space available on the second segment. A storer is configured to store the first group of data onto each first segment and to store the second group of data onto each second segment, and if the space needed to store the first group of data is greater than the amount of space available on the first segment, the storer is configured to store the first primary portion onto the first segment of the first storage medium and the second primary portion onto the first segment of the second storage medium. If the space needed to store the second group of data is greater than the amount of space available on the second segment, the storer is configured to store the second primary portion onto the second segment of the first storage medium and the second secondary portion onto the second segment of the second storage medium. In an embodiment the first group of data comprises trailer data and the second group of data comprises feature data.

A method of storing data on at least one storage medium is also claimed. The data comprises a first group of data and a second group of data. The first storage medium is partitioned into a first segment and a second segment. The space needed to store each group of data is compared with the space allocated on each segment. If the space allocated on each segment is greater than the space required for storage of each group of data, the first group of data is stored onto the first segment and the second group of data is stored onto the second segment. If the amount of space allocated for the first segment is less than the amount of space required for storage of the first group of data, the first group of data is separated into a primary portion and a secondary portion. Also, the second storage medium is partitioned into a first segment and a second segment, and the secondary part of the first group of data is stored onto the first segment of the second storage medium. In an embodiment, if the amount of space allocated for the second segment is less than the amount of space required for storage of the second group of data, the second group of data is separated into a second primary portion and a second secondary portion. Also, the second storage medium is partitioned into a first segment and a second segment, and the second secondary group of data is stored onto the second segment of the second storage medium.

Accordingly, it is an aspect of an embodiment to avoid fragmentation of a plurality of image data files.

It is another aspect of an embodiment to isolate fragmentation to a small portion of a disk and thereby reducing the time needed for defragmentation.

It is another aspect of an embodiment to utilize paged type memory allocation.

It is another aspect of an embodiment to ensure adequate storage space for given compressed files.

It is another aspect of an embodiment to provide a dynamic and configurable space allocation device and method.

It is another aspect of an embodiment to allocate storage resources as a function of the compression bit rate of the compressed data files.

It is another aspect of an embodiment to associate more than one storage device as dedicated to an event.

It is another aspect of an embodiment to prevent accidental swapping of storage media.

BRIEF DESCRIPTION OF THE DRAWINGS

The features, objects, and advantages of the invention will become more apparent from the detailed description set forth below when taken in conjunction with the drawings in which like reference characters identify correspondingly throughout and where in:

FIG. 1 is a block diagram illustrating an apparatus embodying the invention.

FIG. 2 is a diagram illustrating a pair of storage media each partitioned into two segments.

FIG. 3 is a diagram illustrating three storage media each segmented into three sections.

DETAILED DESCRIPTION OF THE PREFERRED EMBODIMENTS

Figure 4:
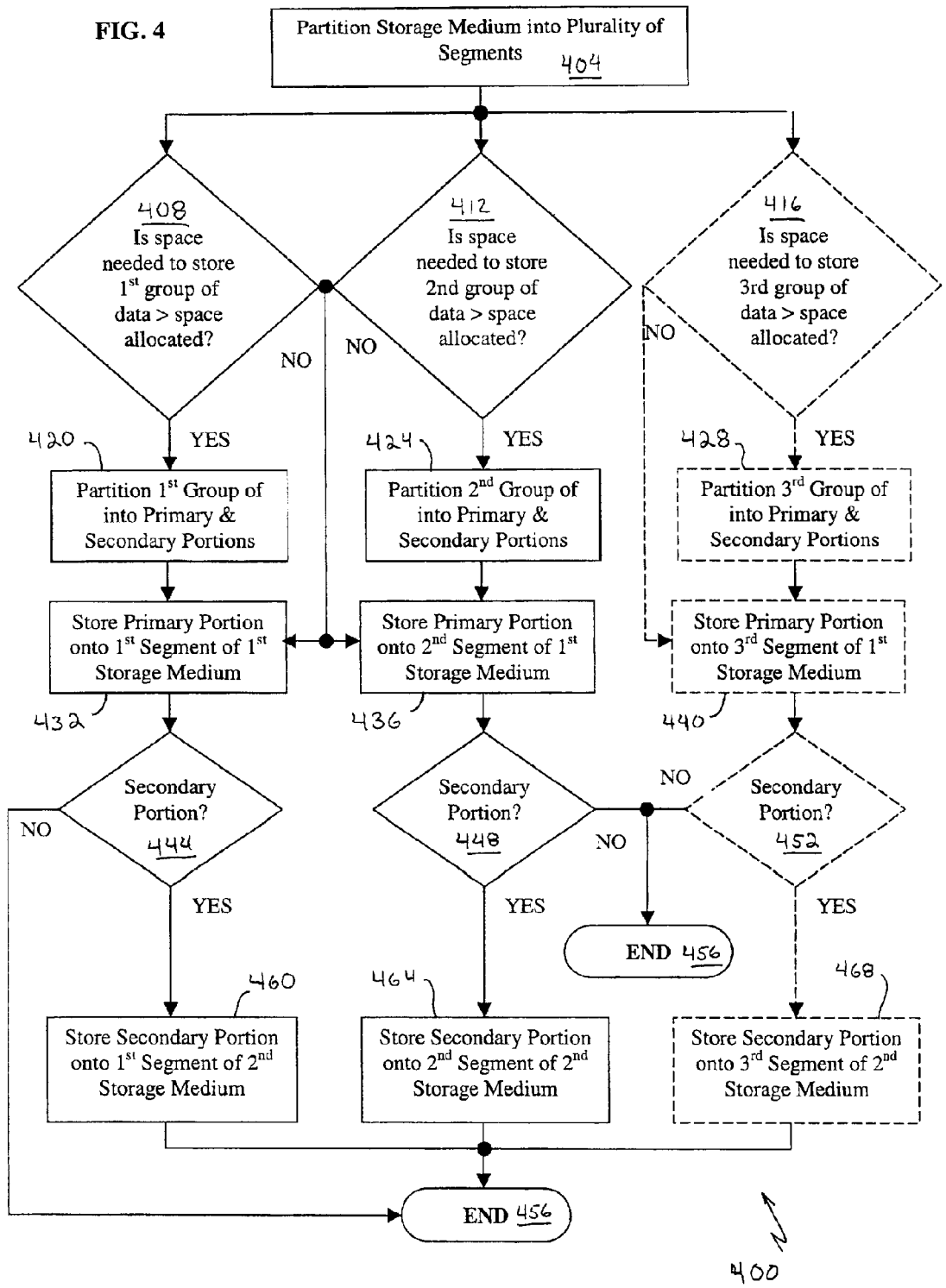
FIG. 4 illustrates a flow chart of space allocation on the plurality of storage media.

FIG. 1 illustrates an apparatus 100 for storing groups of data on one or more storage media. A storage space allocator 104 is connected to a comparer 108. The storage space allocator 104 is configured to partition one or more storage media into two or more segments. The comparer 108 compares the size requirements for groups of data with the amount of space available on segments of storage media. In an embodiment, two groups of data are to be stored on one or more storage media. The comparer 108 compares the space required for the first group of data with the space available on the first segment of the storage medium.

Similarly, the comparer 108 compares the space needed for the second group of data with the amount of space available on the second segment of the storage medium. If the space needed to store the first group of data is greater than the amount of space available on the first segment, the separator is configured to separate the first group of data into a primary portion and a secondary portion. Similarly, if the space needed to store the second group of data is greater than the amount of space available of the second segment of the storage medium, the separator 112 separates the second group of data into a second primary portion and a second secondary portion.

The groups of data are then transferred into a storer 116. The storer is figured to store the first group of data onto each first segment of a storage medium and to store the second group of data onto the second segment of the second storage medium. If more than two storage media are needed, the logical process as described with respect to the embodiment of two segments with two storage media follows. Further, it is apparent to those skilled in the art that any type of storage means may be employed.

If the space needed to store the first group of data is greater than the amount of space available on the first segment, the storer 116 is configured to store the first primary portion onto the first segment of the first storage medium and the second primary portion onto the first segment of the second storage medium. If the space needed to store the second group of data is greater than the amount of space available on the second segment of the second storage medium, the storer is configured to store the second primary portion onto the second segment of the first storage medium and the secondary portion onto the second segment of the second storage medium.

In an embodiment, the first group of data comprises trailer audio and image information, and meta data or media descriptor files. Trailers may refer to preview information, commercials and credits displayed before and after feature data files. The second group of data comprises feature data. Feature data refers to the motion picture to be shown. Meta data is information that describes content of associated files. Media descriptor files comprise information such as, but not limited to, administrative types of files that contain file management information, such as the ratings of the image files, the audio file sound format, language, the type of lens in which the movie was filmed, lengths of files in time, and sizes of files with respect to storage space.

In an embodiment, the storage space allocator 104 is configurable. The storage space allocator 104 may be configured to allocate space as a function of the size and number of data files. As such, the point at which a storage medium may be divided or partitioned may change depending upon the content of the material, the size of a file or program, or the number of trailers or advertisements the theatre operator desires. Therefore, due to material content, the space allocated for a first segment on a first storage medium may be different than the space allocated for a first segment of a second storage medium. Also, a theatre operator may choose to have different points of partition for individual needs that may not be anticipated. Accordingly, an embodiment of the invention offers flexibility to the user to create as many partitions as needed and wherever desired.

The storage medium 120 may be any type of media capable of storing digital data files. Examples include magnetic storage media and optical storage media. Magnetic storage media include devices such as hard drives, tapes, and other low and high capacity disks. Optical storage media include devices such as DVD's and CD's. Although any capacity storage media may be used, in one embodiment a magnetic hard disk having a storage capacity of approximately 72 Gigabytes is used.

FIG. 2 illustrates an embodiment of a pair of storage media 200. A storage medium 204 may be divided into two segments 208 and 212. Segment 208, the larger segment, may be used for storage of larger groups of compressed files, such as a feature data (the motion picture). Segment 212, the smaller segment, may be used for storage of shorter data files, such as trailers and media descriptive files. Similarly, second storage medium 216 is divided into a feature segment 220 and a trailer segment 224.

Accordingly, as the system is used and files are erased and loaded onto the storage media, disk fragmentation is kept to a minimum. For example, different trailers may be shown with a given feature over a period of time. By partitioning the disk as described above, updated trailers need only be loaded onto segments 212 or 224 without having to disturb the feature stored on segments 208 and 220. In this case, fragmentation may occur on smaller segments 212 and 224. Thus, if and when smaller segments 212 and 224 need to be defragmented, time is saved by only having to defragment each smaller segment. Further, partitioning in this manner assures adequate storage space for given data files. For example, some times a large number (and therefore, required storage space) of trailer files are played with a short feature. By partitioning, and in particular configurable partitioning, all the trailers and the feature may be stored on a single storage medium.

Further, use of paged type memory allocation minimizes disk fragmentation. Paged type memory allocation allows transfer of data to occur in large, consistent block sizes. When large block of data are overwritten onto older large blocks of data of the same or similar size, fragmentation is minimized.

FIG. 3 illustrates an alternate embodiment 300 of three storage media, each subdivided into three sections. Each storage media 304, 320 and 336 are divided into three segments. In this embodiment, segments 308, 324 and 340 are configured to store features. Segments 312, 328 and 344 are configured to store trailers. Segments 316, 332 and 348 are configured to store media descriptive files.

In practice, each storage medium may be divided into any number of segments. The preceding examples illustrate divisions based upon features, trailers, and media descriptive files. However, it is apparent to those skilled in the art that the storage media may be partitioned based upon any number of criteria including, but not limited to, audio program or files, image files, logical subdivisions within image files or features, types of trailers, credits, slides or other still images, local commercials, national commercials, safety information, trailers that appear before features, or trailers that appear after features.

FIG. 4 illustrates a flowchart of the allocation and storage process 400. One or more storage media are partitioned into a plurality of segments 404, as described with respect to FIGS. 2 and 3. In an embodiment, there are two groups of compressed data files: the first containing trailer and media descriptive files, and the second group containing feature data. In an alternate embodiment, a third group of data may also be separately segmented. For example, the first group of data may comprise of trailer data files, the second group of data may comprise of media descriptive files, and the third group of data may contain feature data files.

With respect to the first of group of data, a comparison is made as to whether the space needed to store the first group of data is greater than the first allocated on the first segment 408. Similarly, the comparison is made with respect to the second group of data in that as the space needed to store the second group of data greater than the space allocated on the second segment. As follows, the same comparison is made with respect to the third group of data, namely, is the space needed to store the third group of data greater than then space allocated on the third segment 416. If more space is needed than what is allocated in any segments (yes to the inquiries of 408, 412 or 416), the corresponding group of data is divided into primary and secondary portions. Accordingly, if the space needed to store the first group of data is greater than the space allocated on the first segment, the first group of data is partitioned into primary and secondary portions 420. If the space needed to store the second group of data is greater than the space allocated on the second segment, the second group of data is partitioned into primary and secondary portions 424. Similarly, if the space needed to store the third group of data is greater than the space allocated on the third segment, the third group of data is also partitioned into primary and secondary portions 428.

If more space in not needed than what is allocated, (that is, the inquires in steps 408, 412 and 416 are no), all of the data of the given group is stored on it's corresponding segment. Thus, if the space needed to store the first group of data is less than the space allocated for the first group of data on the first segment, the first group of data is stored on the first segment of the first storage medium 432. If the space needed to store the second group is less than the space allocated on the segment, the second group of data is stored onto the second segment of the first storage medium 436. Similarly, if the space needed to store the third group data is less than the space allocated on the third segment, the third group of data is stored onto the third segment of the first storage medium 440.

In those situations where the response to inquiries to steps 408, 412 and 416 are affirmative, the primary portion of each group of data is stored onto the first segment of each storage medium. Thus, the primary portion of the first group of data is stored onto the primary portion of the first segment of the first storage medium 432, the primary portion of the second group of data is stored onto the second segment of the first storage medium 436, and the primary portion of the third group of data is stored onto the third segment of the first storage medium 440. Next, an inquiry is made as to whether a second secondary portion exists for each group of data. This is illustrated in steps 444, 448 and 452. If the answer is that no secondary portion exists for all of the groups of data, the process ends (456). However, if any group of data requires has a secondary portion, the secondary portion of that group of data is stored onto its corresponding segment on a second storage medium. As such, if the secondary portion for the first group of data exists, the secondary portion of the first group of data is stored onto the first segment of the second storage medium 460. If a secondary portion exists for the second group of data, the secondary portion of the second group of data is stored onto the second segment of the second storage medium 464. Similarly, if a secondary portion of the third segment of data exists, the secondary portion of the third group of data is stored onto the third segment of the second storage medium 468. After which, the process ends at step 456.

The description with respect to FIG. 4 is described above with decision points and inquiries. It is apparent to those skilled in the art that such comparisons may be made in a variety of ways, such as duration of files or bit rates. In an embodiment, comparisons are made in software by comparing the size of the image files, as defined in the media descriptive files, with the space allocated on each given segment. It an alternate embodiment, the user may be prompted to adjust the partitions in order to more efficiently store the files on selected storage media.

As examples, the various illustrative logical blocks, flowcharts, and steps described in connection with the embodiments disclosed herein may be implemented or performed in hardware or software with a an application specific integrated circuit (ASIC), a programmable logic device, discrete gate or transistor logic, discrete hardware components such as, e.g., registers and FIFO, a processor executing a set of firmware instructions, any conventional programmable software module and a processor, or any combination thereof. The processor may advantageously be a microprocessor, but in the alternative, the processor may be any conventional processor, controller, microcontroller, or state machine. The software module could reside in RAM memory, flash memory, ROM memory, registers, hard disk, a removable disk, a CD-ROM, a DVD-ROM or any other form of storage medium known in the art.

The previous description of the preferred embodiments is provided to enable any person skilled in the art to make or use the present invention. The various modifications to these embodiments will be ready apparent to those skilled in the art, and the generic principles to find herein may be applied to other embodiments without the use of inventive faculty. Thus, the present invention is not intended to be limited to the embodiments shown herein but is to be corded the widest scope consistent with the principles and novel features disclosed herein.

What we claim as our invention is:

1. apparatus for the storage of a first group and a second group of data on at least one machine readable storage medium, the apparatus comprising:

a storage space allocator configured to partition the first storage medium into a first segment and a second segment; a comparer configured to compare the space needed to store the first group of data with the amount of space available on the first segment and to compare the space needed to store the second group of data with the amount of space available on the second segment;

a separator configured to separate the first group of data into a first primary portion and a first secondary portion if the space needed to store the first group of data is greater than the amount of space available on the first segment, and to separate the second group of data into a second primary portion and a second secondary portion if the space needed to store the second group of data is greater than the amount of space available on the second segment;

and a storer configured to store the first group of data onto each first segment and to store the second group of data onto each second segment, and if the space needed to store the first group of data is greater than the amount of space available on the first segment, the storer is configured to store the first primary portion onto the first segment of the first storage medium and the second primary portion onto the first segment of the second storage medium, and if the space needed to store the second group of data is greater than the amount of space available on the second segment, the storer is configured to store the second primary portion onto the second segment of the first storage medium and the second secondary portion onto the second segment of the second storage medium.

2. The apparatus set forth in claim 2, wherein the first group of data comprises trailer data and the second group of data comprises feature data.

3. The apparatus set forth in claim 1, wherein the first group of data comprises trailer data and media descriptor files and the second group of data comprises feature data.

4. The apparatus set forth in claim 1, wherein data comprising more than one trailer or more than one feature may be stored on the same segment.

5. The apparatus set forth in claim 1, wherein the first and second groups of data are compressed.

6. The apparatus set forth in claim 5, wherein the allocator is configurable.

7. The apparatus set forth in claim 6, wherein the allocator is dynamic such that the space allocated for the first segment of the first storage medium is different than the space allocated for the first segment of the second storage medium.

8. The apparatus set forth in claim 1, wherein the first and second group of data comprises compressed image and audio data.

9. The apparatus set forth in claim 1, wherein multiple storage media are logically linked.

10. The apparatus set forth in claim 1, wherein the storage medium is a magnetic storage medium.

11. The apparatus set forth in claim 10, wherein the magnetic storage medium is a hard drive.

12. The apparatus set forth in claim 1, wherein the storage medium is an optical storage medium.

13. A method of storing data on at least one machine readable storage medium, the data comprising a first group of data and a second group of data, the method comprising:

partitioning the first storage medium into a first segment and a second segment; comparing the space needed to store each group of data with the space allocated on each segment, and if the space allocated on each segment is greater than the space required for storage of each group of data; storing the first group of data onto the first segment; storing the second group of data onto the second segment; and if the amount of space allocated for the first segment is less than the amount of space required for storage of the first group of data, separating the first group of data into a primary portion and a secondary portion;

partitioning the second storage medium into a first segment and a second segment; and storing the secondary part of the first group of data onto the first segment of the second storage medium.

14. The method set forth in claim 13, where if the amount of space allocated for the second segment is less than the amount of space required for storage of the second group of data, further comprising the steps of:

separating the second group of data into a second primary portion and a second secondary portion; partitioning the second storage medium into a first segment and a second segment; and storing the second secondary group of data onto the second segment of the second storage medium.

15. The method set forth in claim 13, wherein the steps of storing the first and second groups of data will not occur unless the required amount of space is available.

16. The method set forth in claim 13, wherein the first group of data comprises trailer data and the second group of data comprises feature data.

17. The method set forth in claim 13, wherein the first group of data comprises trailer data and media descriptive files and the second group of data comprises feature data.

18. The method as set forth in claim 13, wherein data comprising more than one trailer or more than one feature may be stored on the same segment.

19. The method as set forth in claim 13, wherein the first and second group of data is compressed data.

20. The method as set forth in claim 13, wherein the step of partitioning is configurable.

21. The method as set forth in claim 20, wherein the step of configurable partitioning is dynamic such that the space allocated for the first segment of the first storage medium is different than the space allocated for the first segment of the second storage medium.

22. The method as set forth in claim 13, wherein the first and second group of data comprises compressed image and audio data.

23. The method as set forth in claim 13, wherein the storage media are logically linked.

24. The method as set forth in claim 13, wherein the storage medium is a magnetic storage medium.

25. The method as set forth in claim 24, wherein the magnetic storage medium is a hard drive.

26. The method as set forth in claim 13, wherein the storage medium is an optical storage medium.

27. An apparatus for the storage of groups of data on at least one machine readable storage medium, the apparatus comprising: means for partitioning the first storage medium into a first segment and a second segment; means for comparing the space needed to store each group of data with the space allocated on each segment, and if the space allocated on each segment is greater than the space required for storage of each group of data; means for storing the first group of data onto the first segment; means for storing the second group of data onto the second segment; and if the amount of space allocated for the first segment is less than the amount of space required for storage of the first group of data, means for separating the first group of data into a primary portion and a secondary portion; means for partitioning the second storage medium into a first segment and a second segment; and means for storing the secondary part of the first group of data onto the first segment of the second storage medium.

28. The apparatus set forth in claim 27, where if the amount of space allocated for the second segment is less than the amount of space required for storage of the second group of data, the apparatus further comprising: means for separating the second group of data into a second primary portion and a second secondary portion; means for partitioning the second storage into a first segment and a second segment; and means for storing the second secondary group of data onto the second segment of the second storage medium.

29. The apparatus set forth in claim 27, wherein the first and second groups of data will not be stored unless the required amount of space is available.

30. The apparatus set forth in claim 27, wherein the first group of data comprises trailer data and the second group of data comprises feature data.

31. The apparatus set forth in claim 27, wherein the first group of data comprises trailer data and media descriptive files and the second group of data comprises feature data.

32. The apparatus as set forth in claim 27, wherein data comprising more than one trailer or more than one feature may be stored on the same segment.

33. The apparatus as set forth in claim 27, wherein the groups of data are compressed.

34. The apparatus as set forth in claim 27, wherein the means for partitioning is configurable.

35. The apparatus as set forth in claim 34, wherein the means for configurable partitioning is dynamic such that the space allocated for the first segment of the first storage medium is different than the space allocated for the first segment of the second storage medium.

36. The apparatus as set forth in claim 27, wherein the first and second group of data comprises compressed image and audio data.

37. The apparatus set forth in claim 27, wherein the storage media are logically linked.

38. The apparatus set forth in claim 27, wherein the storage medium is a magnetic storage medium.

39. The apparatus set forth in claim 38, wherein the magnetic storage medium is a hard drive.

40. The apparatus set forth in claim 27, wherein the storage medium is an optical storage medium.

41. A method of storing data on at least one machine readable storage medium, the data comprising trailer data and feature data, the method comprising:

partitioning the at least one storage medium into at least one first portion and at least one second portion;

comparing the amount of space the trailer will consume with the amount of space available on the least one first portion of the at least one storage medium;

comparing the amount of space the feature will consume with the amount of space available on at the least one the second portion of the at least one storage medium, and storing compressed trailer data onto at the least one first portion of the at least one storage medium; and storing compressed feature data onto at the least one said second portions of the at least one storage medium;

wherein the comparing steps occur before the step of storing compressed trailer data and compressed feature data, and if the space required for storage of the trailer data is greater than the space allocated on the at least one first portion of the at least one storage medium; partitioning a second storage medium into at least one first portion and at least one second portion; and storing a secondary part of the trailer data onto the at least one first portion of the second storage medium, and if the space required for storage of the feature data is greater than the space allocated on the at least one second portion of the at least one storage medium, partitioning the second storage medium into at least one first portion and at least one second portion; and storing a secondary part of the feature data onto the at least one second portion of the second storage medium.

42. The method as set forth in claim 41, wherein the steps of storing compressed trailer data and storing compressed feature data will not occur unless the required amount of space is available.

43. The method as set forth in claim 41, wherein the data further comprises media descriptive files, and the step of storing compressed trailer data further comprises storing media descriptive files onto each first portion.

44. The method as set forth in claim 41, wherein data comprising more than one trailer or more than one feature may be stored on the same portion.

45. The method as set forth in claim 41, A wherein the step of partitioning is configurable.

46. The method as set forth in claim 45, wherein the step of configurable partitioning is dynamic such that the space allocated for the first portion of the first storage medium is different than the space allocated for the first portion of the second storage medium.

47. The method as set forth in claim 41, wherein the first and second group of data comprises compressed image and audio data.

48. The method as set forth in claim 41, wherein the storage media are logically linked.

49. The method as set forth in claim 41, wherein the storage medium is a magnetic storage medium.

50. The method as set forth in claim 49, wherein the magnetic storage medium is a hard drive.

51. The method as set forth in claim 41, wherein the storage medium is an optical storage medium.

* * * * *